United States Patent
Liu et al.

(10) Patent No.: US 7,260,050 B2
(45) Date of Patent: Aug. 21, 2007

(54) APPARATUS FOR DETECTING PHYSICAL MARKS FROM WOBBLE SIGNAL AND METHOD THEREOF

(75) Inventors: Pi-Hai Liu, Taipei (TW); Chun-Nan Chen, Taipei (TW)

(73) Assignee: Mediatek, Inc. (TW)

( * ) Notice: Subject to any disclaimer, the term of this patent is extended or adjusted under 35 U.S.C. 154(b) by 262 days.

(21) Appl. No.: 10/711,867

(22) Filed: Oct. 11, 2004

(65) Prior Publication Data

US 2006/0044960 A1    Mar. 2, 2006

Related U.S. Application Data

(63) Continuation of application No. 10/710,948, filed on Aug. 13, 2004.

(51) Int. Cl.
*G11B 7/00* (2006.01)
(52) U.S. Cl. ............................... 369/124.15; 369/47.1; 369/124.4
(58) Field of Classification Search ..................... None
See application file for complete search history.

(56) References Cited

U.S. PATENT DOCUMENTS

| | | | | |
|---|---|---|---|---|
| 6,091,699 | A * | 7/2000 | Nakane et al. | 369/44.34 |
| 6,282,160 | B1 * | 8/2001 | Tateishi et al. | 369/47.22 |
| 6,381,201 | B1 * | 4/2002 | Shihara et al. | 369/32.01 |
| 6,385,257 | B1 * | 5/2002 | Tobita et al. | 375/334 |
| 6,577,590 | B2 * | 6/2003 | Minamino et al. | 369/275.3 |
| 6,757,239 | B2 * | 6/2004 | Minamino et al. | 369/47.21 |
| 2004/0120238 | A1 * | 6/2004 | Chen et al. | 369/53.34 |
| 2006/0044959 | A1 * | 3/2006 | Liu et al. | 369/53.1 |

FOREIGN PATENT DOCUMENTS

CN    1497580 A    5/2004

* cited by examiner

*Primary Examiner*—Thang V. Tran
(74) *Attorney, Agent, or Firm*—Connolly Bove Lodge & Hutz, LLP

(57) ABSTRACT

An apparatus for detecting physical marks from a wobble signal includes a matching value operation unit, a threshold value generator and a physical mark indicator. A wobble signal is converted into a matched signal by the matching value operation unit according to the waveform difference between a normal clock signal or a specific matching reference signal and itself, wherein the matching reference signal needs to highlight the existed physical mark. The physical mark indicator designates a threshold value that depends on the status of the wobble signal, and compares the matched signal with the threshold value to output a physical mark indication signal. The threshold value is selected from at least two different default values. Furthermore, a decoder is employed to convert the physical mark indication signal into wobble data with physical address information.

77 Claims, 16 Drawing Sheets

FIG. 1 (Background Art)

APPARATUS FOR DETECTING PHYSICAL MARKS FROM WOBBLE SIGNAL AND METHOD THEREOF

CROSS REFERENCE TO RELATED APPLICATIONS

This Application is a Continuation of application Ser. No. 10/710,948 filed on Aug. 13, 2004, the entire contents of which are incorporated herein by reference.

BACKGROUND OF THE INVENTION

1. Field of the Invention

The present invention relates to an apparatus for detecting physical marks from a wobble signal and a method thereof, more particularly to an apparatus capable of detecting physical marks by means of several threshold values or several offset values.

2. Description of the Related Art

When the mold of a recordable optical storage medium is engraved with grooves, the shallow grooves start from the center of the optical storage and are spirally formed thereon by means of a laser beam. Known as a pre-groove, the groove does not look like a smooth spiral; instead, it is a perturbed spiral that wobbles in a sinusoidal waveform of tiny amplitude. A signal read from the pre-groove is hereinafter referred to as a "wobble signal." Every sector on an optical disc contains time-related data to provide address information for positioning the pick-up head.

Since the address code information is provided by the wobbling pre-groove, such information is called ADIP (Address In Pre-groove) data. To produce a recordable optical disc, the disc producing machine encodes the physical address information, and then the encoded data are converted into wobble signals, which are recorded on the tracks of the recordable optical disc, by minimum shift keying modulation (hereinafter referred to as "MSK modulation"), harmonic modulated wave modulation (hereinafter referred to as "HMW modulation"), etc.

Later on, to retrieve the recorded data, the optical storage device demodulates the wobble signals first and then decodes them in order to read the corresponding physical address information for accurately positioning the pick-up head.

FIG. 1 is a schematic diagram of the structure of an ADIP address word recorded on the pre-grooves of a Blu-ray disc after an MSK modulation. An ADIP address word 10 is represented by a data matrix of 56 columns and 83 rows, wherein each row is named an ADIP unit, and each element is equivalent to a wobble length. If three continuous wobble lengths respectively show data of 1,2 and 3, they represent a physical mark 11. The physical mark 11 is based on the MSK modulation, so it is also named an MSK mark. Physical address information consists of a plurality of MSK marks.

FIG. 2(a) is a functional block diagram of a conventional apparatus for detecting physical marks existing in a wobble signal. A wobble signal is converted into a matched signal by the matching value operation unit 21 of a physical-mark detection apparatus 20, and the matched signal is compared with a fixed threshold value by means of a comparator 22. The compared signal is decoded by a decoder 23 for obtaining wobble data with physical mark information.

FIG. 2(b) is a waveform diagram of signals converted from a wobble signal on a Blu-ray disc by a matching value operation unit 21. The signal at the first line is a normal clock signal with a plurality of monotone square pulses for the matching value operation unit 21 to refer to it for processing signals. On the other hand, the matching value operation unit 21 can also refer to a matching reference signal, at the third line, with a specific waveform. The product signal that the wobble signal is multiplied by the matching reference signal includes a physical mark 25' within three continuous wobble length periods, as shown in the fourth line in FIG. 2(b). The physical mark 25' corresponding with the physical mark 25 of the wobble signal represents an MSK mark. If the product signal is integrated or accumulated with a time interval to obtain a cumulating signal, a larger matching value 25" can be obtained from the corresponding interval 25' of the physical mark 25 in the wobble signal. On the contrary, a smaller matching values is obtained from the other intervals excluding the interval 25' by the integral of the product signal. The matching value is compared with the threshold value to decide whether a physical mark exists.

In addition to the application of the Blu-ray disc, the wobble signal data, as shown in FIG. 1, is obtained, and the physical-mark detection apparatus 20 is also applied to an HD DVD (High Density Digital Versatile Disc) disc and DVD+RW disc, both of which have similar wobble signals.

FIG. 3 is a waveform diagram of the compared signals of a wobble signal on a DVD+RW disc processed by the matching value operation unit 21. The signal at the first line is a normal clock signal, including a plurality of monotone square pulses, for the matching value operation unit 21 to refer to it. The wobble signal has a physical mark 31 occurring within four continuous wobble length periods, and the physical mark 31 and the normal clock signal are opposite in phase. A sync unit product signal is produced by multiplying the wobble signal by the normal clock signal, and the bit zero product signal and bit one product signal are also produced by the same multiplying operation.

The waveform, shown in FIG. 4, is resulted from the similar signal conversion applied to an HD DVD disc. The wobble signal has two physical marks 41, each occurring within 6 continuous wobble length periods. The sync unit product signal, unity unit product signal, address 000 product signal and address 001 product signal are produced by multiplying the wobble signal by the normal clock.

The physical-mark detection apparatus 20 merely employs the fixed threshold value 24 to decide whether a physical mark exists or not, but occasionally the decision result of existence or non-existence for a physical mark is erroneous due to the distortion of the wobble signal. In other words, no matter how the magnitude of the fixed threshold value 24 is employed, the erroneous decision result of the existence or nonexistence still occurs.

SUMMARY OF THE INVENTION

One objective of the present invention is to provide an apparatus for detecting physical marks from a wobble signal and a method thereof. The method is intended to detect where physical marks exist in a wobble signal according to at least two threshold values or to highlight where physical marks probably exist in a wobble signal according to at least two offset values. Therefore, physical address information can be accurately read from the detected physical marks so as to correctly position an optical pick-up head.

Another objective of the present invention is to provide an apparatus for detecting physical marks from a wobble signal and a method thereof, which is capable of flexibly selecting a threshold value in response to what the structure of wobble data shows. Referring to the predetermined threshold value, it is confirmed whether the physical marks exist in the highlighted region of the wobble data, hence the detection of the physical marks is free from signal noises and signal distortion.

In order to achieve the objectives, the present invention discloses an apparatus for detecting physical marks from a wobble signal, which comprises a matching value operation unit, a threshold value generator and a physical mark indicator. A wobble signal is converted into a matched signal by the matching value operation unit according to the waveform difference between a matching reference signal and itself, wherein the matching reference signal is capable of distinguishing the existed physical mark. The physical mark indicator designates a threshold value that depends on the status of the wobble signal, and compares the matched signal with the threshold value to output a physical mark indication signal. The threshold value is selected from at least two different default values by the physical mark indicator. Furthermore, a decoder is employed to convert the physical mark indication signal into wobble data with physical address information.

The physical mark indicator designates an offset value that depends on the status of the wobble signal, and the matched signal is compensated by the offset value to weight the probability of physical mark existence. The offset value is selected from at least two different default values by the physical mark indicator.

The status of the wobble signal depends on the positions where the physical marks exist in the previous wobble data or the significance of the positions.

Furthermore, the physical mark indicator includes a comparator and a threshold value generator. The threshold value generator designates a threshold value that depends on the status of the wobble signal, and the comparator compares the matched signal with the threshold value to output a physical mark indication signal.

BRIEF DESCRIPTION OF THE DRAWINGS

The invention will be described according to the appended drawings in which:

FIG. 1 is a schematic diagram of the structure of an ADIP address word recorded on the pre-grooves of a Blu-ray disc after an MSK modulation;

PREFERRED EMBODIMENT OF THE PRESENT INVENTION

Figure 2A:
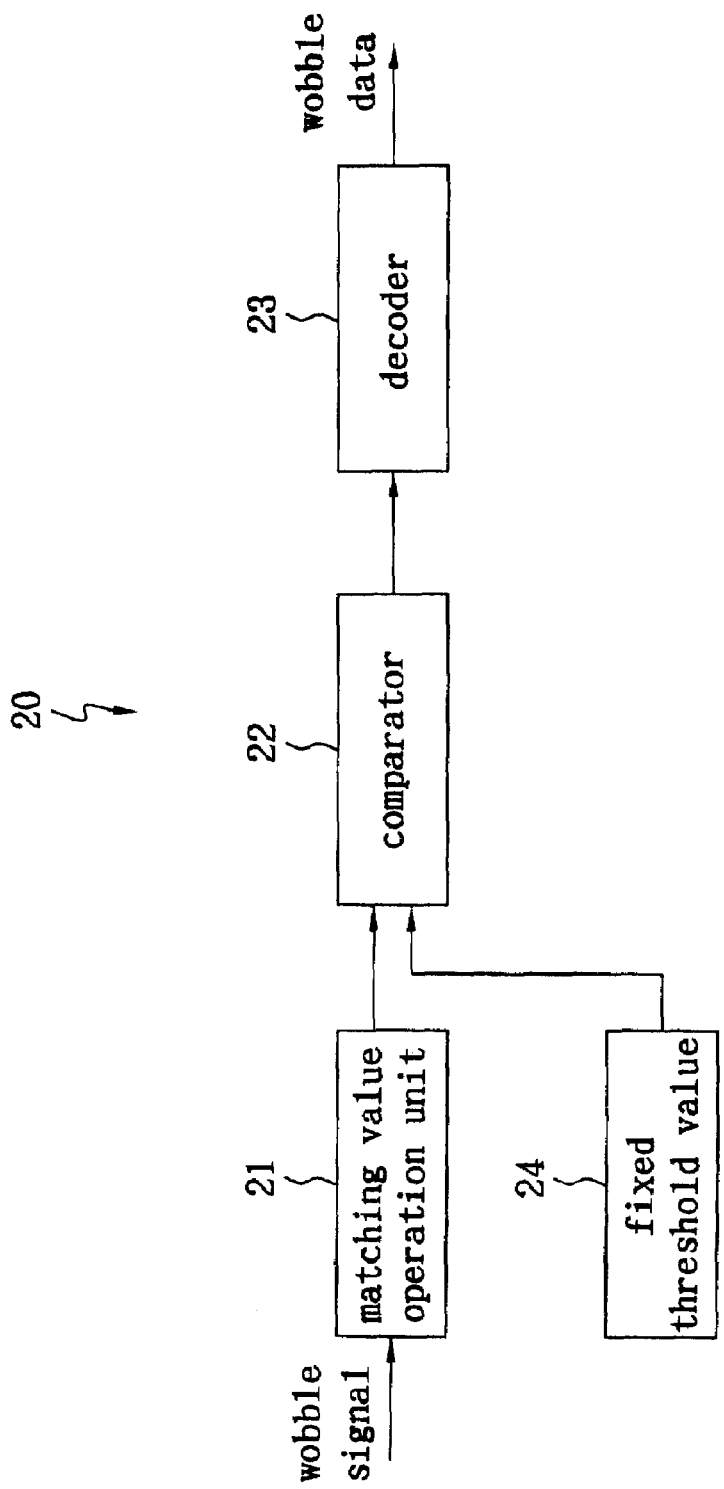
FIG. 2(a) is a functional block diagram of a conventional apparatus for detecting physical marks existing in a wobble signal.
Figure 2B:
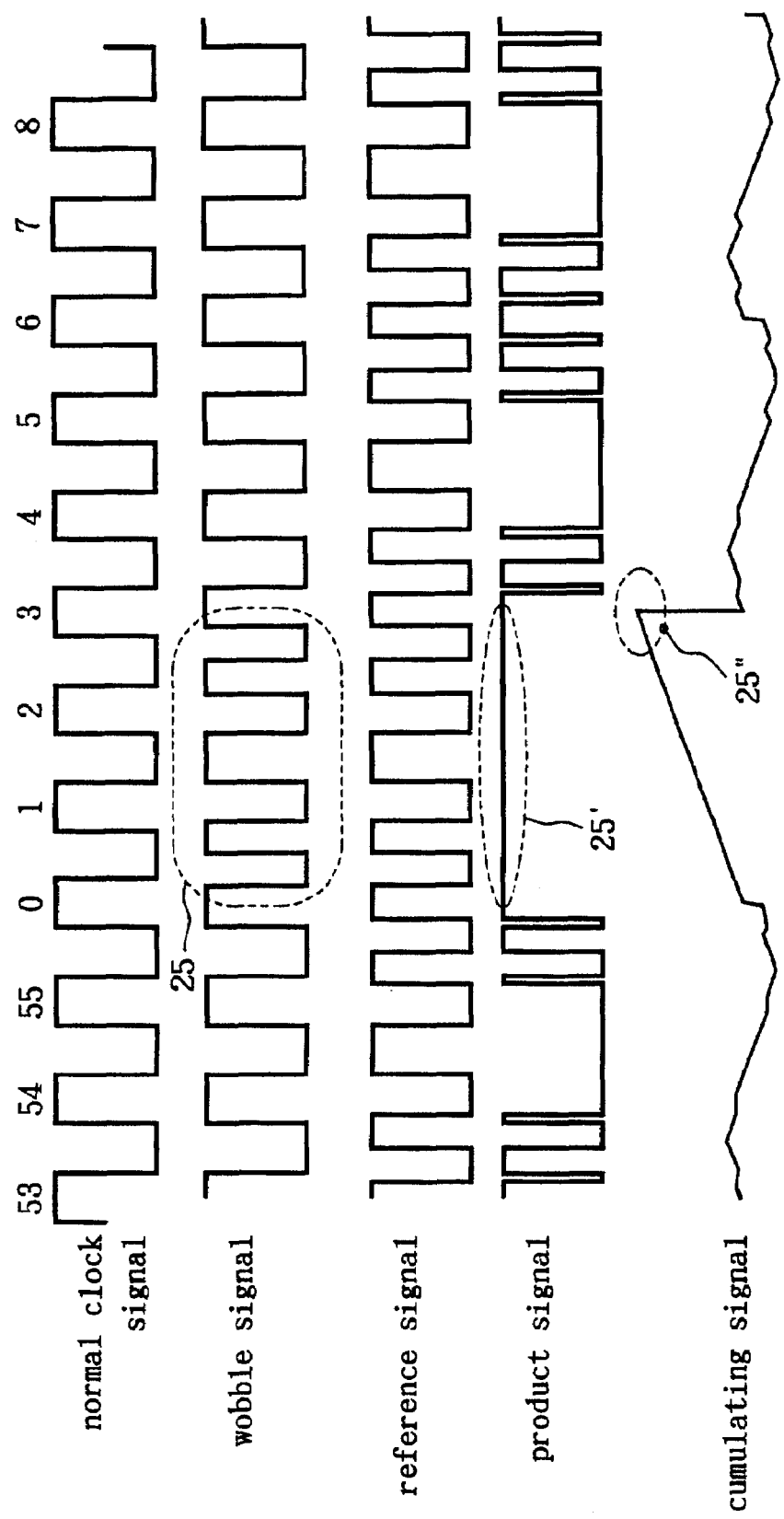
FIG. 2(b) is a waveform diagram of the processed signals of a wobble signal on a Blu-ray disc converted by a matching value operation unit.
Figure 3:
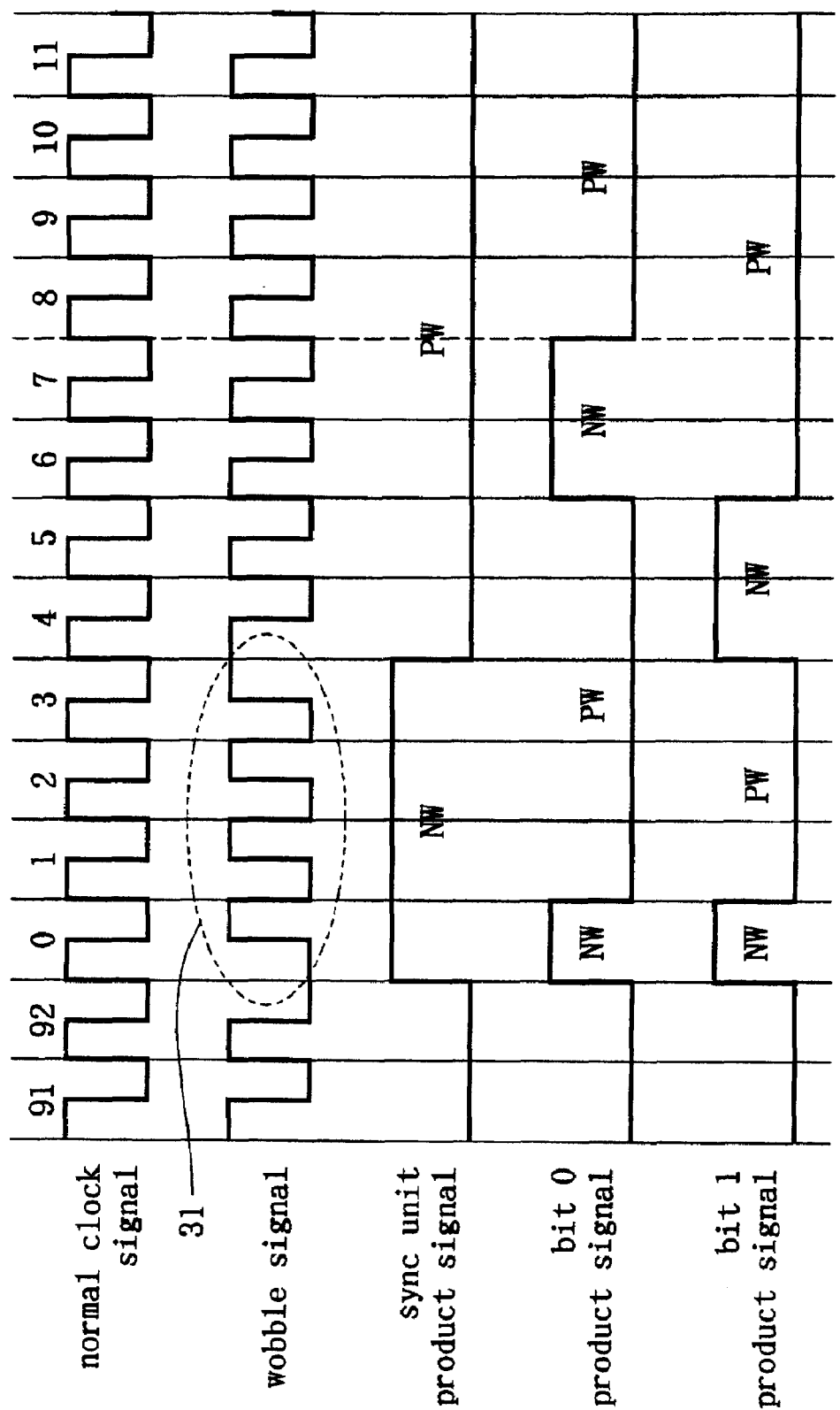
FIG. 3 is a waveform diagram of the processed signals of a wobble signal on a DVD+RW disc converted by a matching value operation unit.
Figure 4:
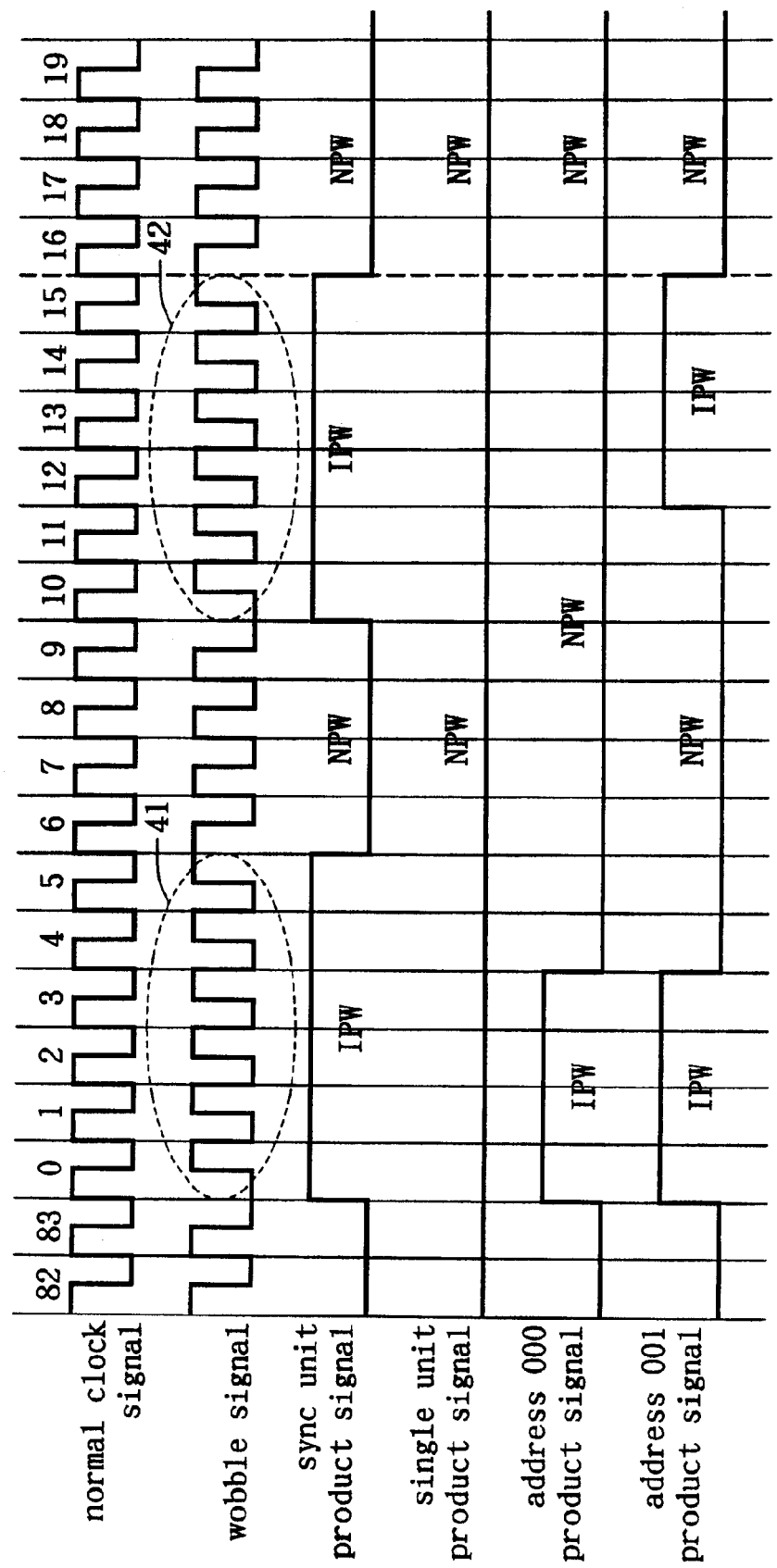
FIG. 4 is a waveform diagram of the processed signals of a wobble signal on an HD DVD disc converted by a matching value operation unit.
Figure 5A:
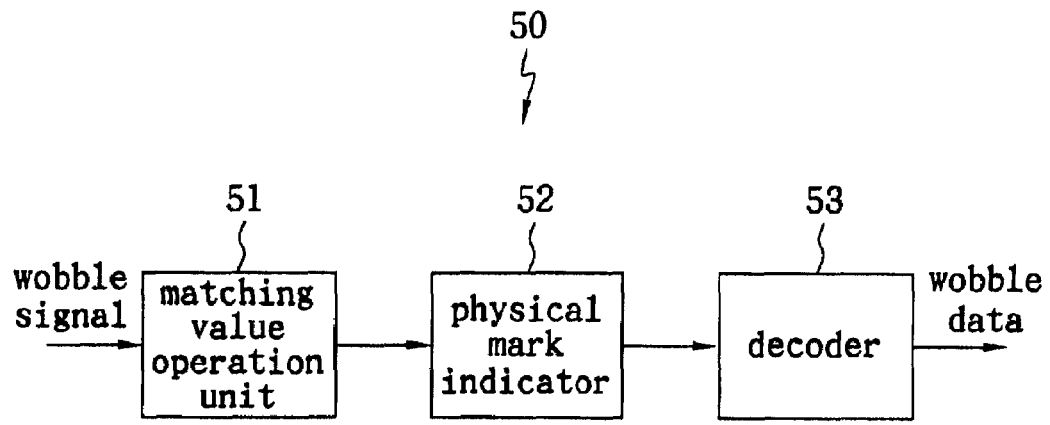
FIG. 5(a) is a functional block diagram of an apparatus for detecting physical marks from a wobble signal in accordance with one embodiment of the present invention.

FIG. 5(a) is a functional block diagram of an apparatus for detecting physical marks from a wobble signal in accordance with one embodiment of the present invention, wherein the criterion of signal process is dynamically determined according to the status of a wobble signal. The physical-mark detection apparatus 50 comprises a matching value operation unit 51 that converts the wobble signal into a matched signal by referring to a normal clock signal or a specific matching reference signal. The matched signal is an accumulation result depending on the comparison between the wobble signal and the matching reference signal. A physical mark indicator 52 designates a threshold value according to the status of the wobble signal, and outputs a physical mark indication signal after the comparison between the threshold value and the matched signal. The designated threshold value is selected from at least two different threshold values. In addition to the application of the threshold value, the physical mark indicator 52 can also designate an offset value according to the status of the wobble signal, and the matched signal is compensated by the offset value to have a weight in response to the probability of physical mark existence. The offset value is selected from at least two different default values. Similarly, the compensated signal or synthesized signal is converted into a physical mark indication signal after being compared with a fixed threshold value. Afterward, a decoder 53 converts the physical mark indication signal into wobble data with physical address information.

Figure 5B:
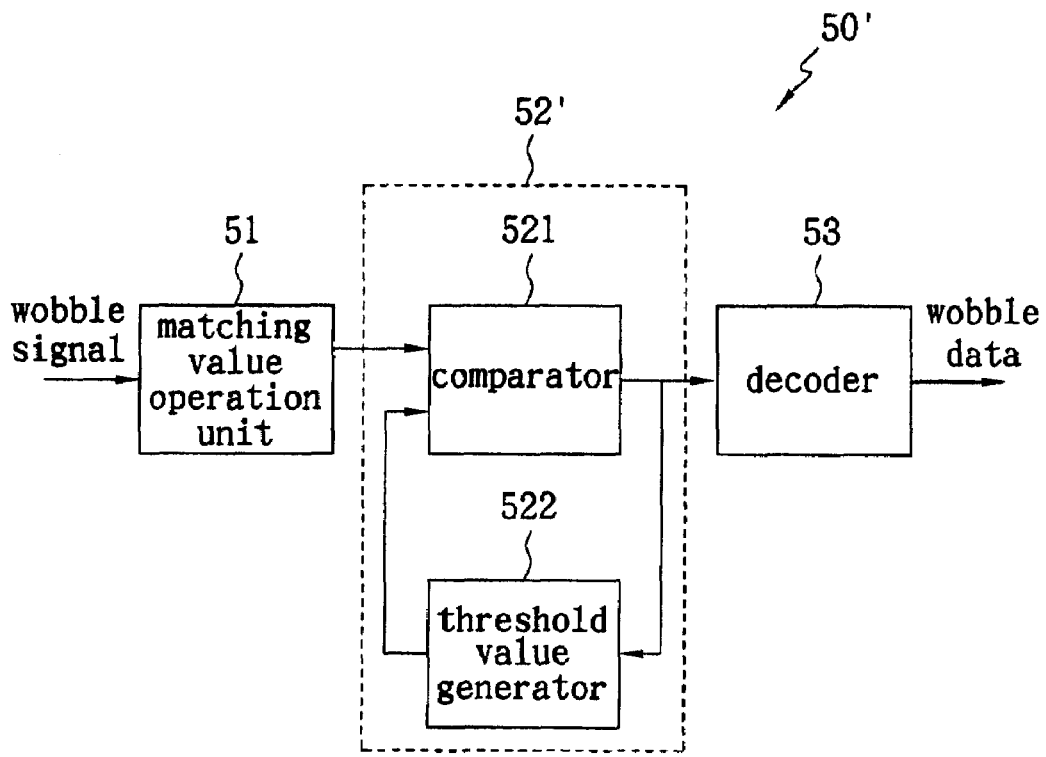
FIG. 5(b) is a functional block diagram of an apparatus for detecting physical marks from a wobble signal in accordance with another embodiment of the present invention.

FIG. 5(b) is a functional block diagram of an apparatus for detecting physical marks from a wobble signal in accordance with another embodiment of the present invention, wherein the threshold value of the signal process is dynamically determined according to the status of a wobble signal. In comparison with the apparatus 50 in FIG. 5(a), the physical-mark indicator 52' of the apparatus 50' further comprises a comparator 521 and a threshold value generator 522 that generates a suitable threshold value according to the statistical information of previous physical mark indication signals. A current physical mark indication signal is output from the comparator 521 after the comparison between the threshold value and matched signal. The statistical information is related to the probability of the occurrence of the physical mark or the significance of the positions where the physical marks exist.

Figure 1:
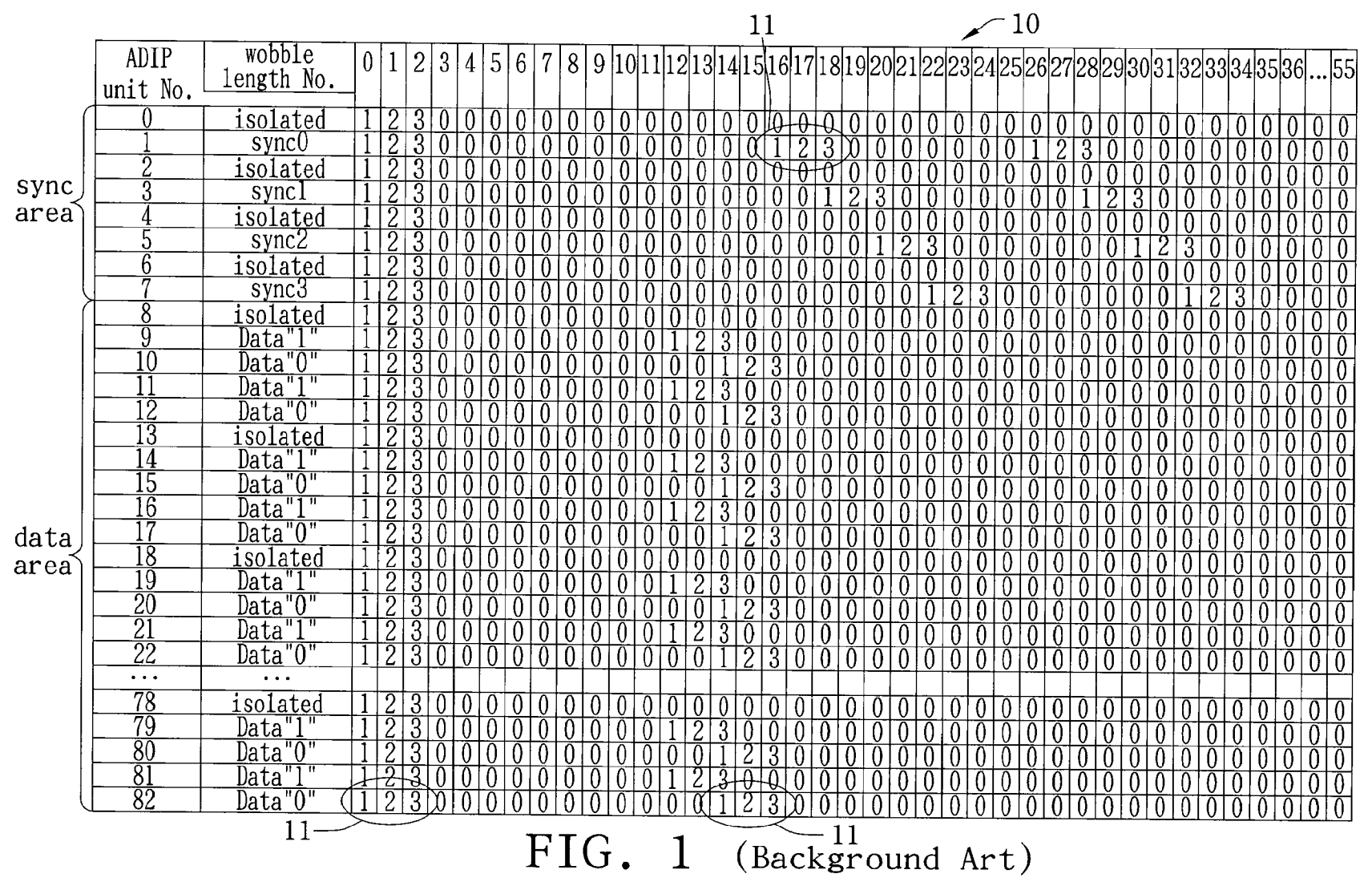

Referring to the data structure of the ADIP address word in FIG. 1, the center positions of the physical marks or MSK marks are represented by the wobble length numbers including numbers 1, 13, 15, 17, 19, 21, 23, 27, 29, 31 and 33. If the delay interval of the signal process is two wobble lengths, the aforesaid position numbers need to be shifted two numbers ahead, so 11, 13, 15, 17, 19, 21, 25, 27, 29, 31 and 55 are produced by the shift. All the renewed numbers are separately stored in each of registers 621-629, 62a and 62b, as shown in FIG. 6.

Figure 6:
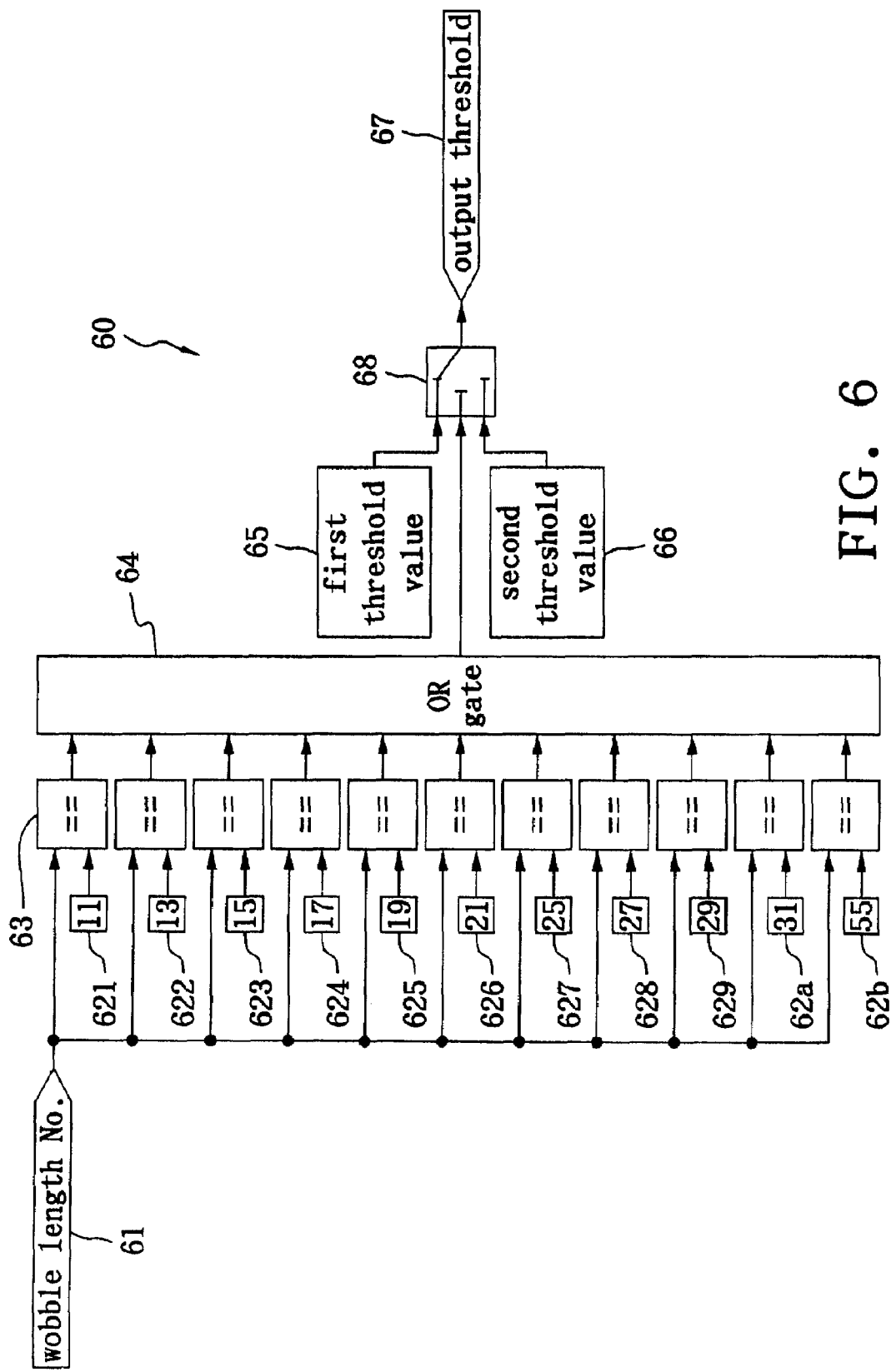
FIG. 6 is a circuit diagram of a threshold value generator in FIG. 5(b)

FIG. 6 is a circuit diagram of a threshold value generator 522 in FIG. 5(b). The wobble length number 61 of a wobble signal is separately compared with the numbers stored in the registers 621-629, 62a and 62b by identification units 63. If the input terminals of the identification unit 63 are input the same number, one of the input terminals of an OR gate 64 is activated by a corresponding input signal. Afterward, a multiple switch 68 is enabled to switch to a first threshold value 65 by the output of the OR gate 64. Then, the first threshold value 65 is designated as the output threshold value 67 of the threshold value generator 60. On the contrary, the multiple switch 68 is switched to a second threshold value 66, hence the second threshold value 66 is the output threshold value 67 in this condition.

Figure 6A:
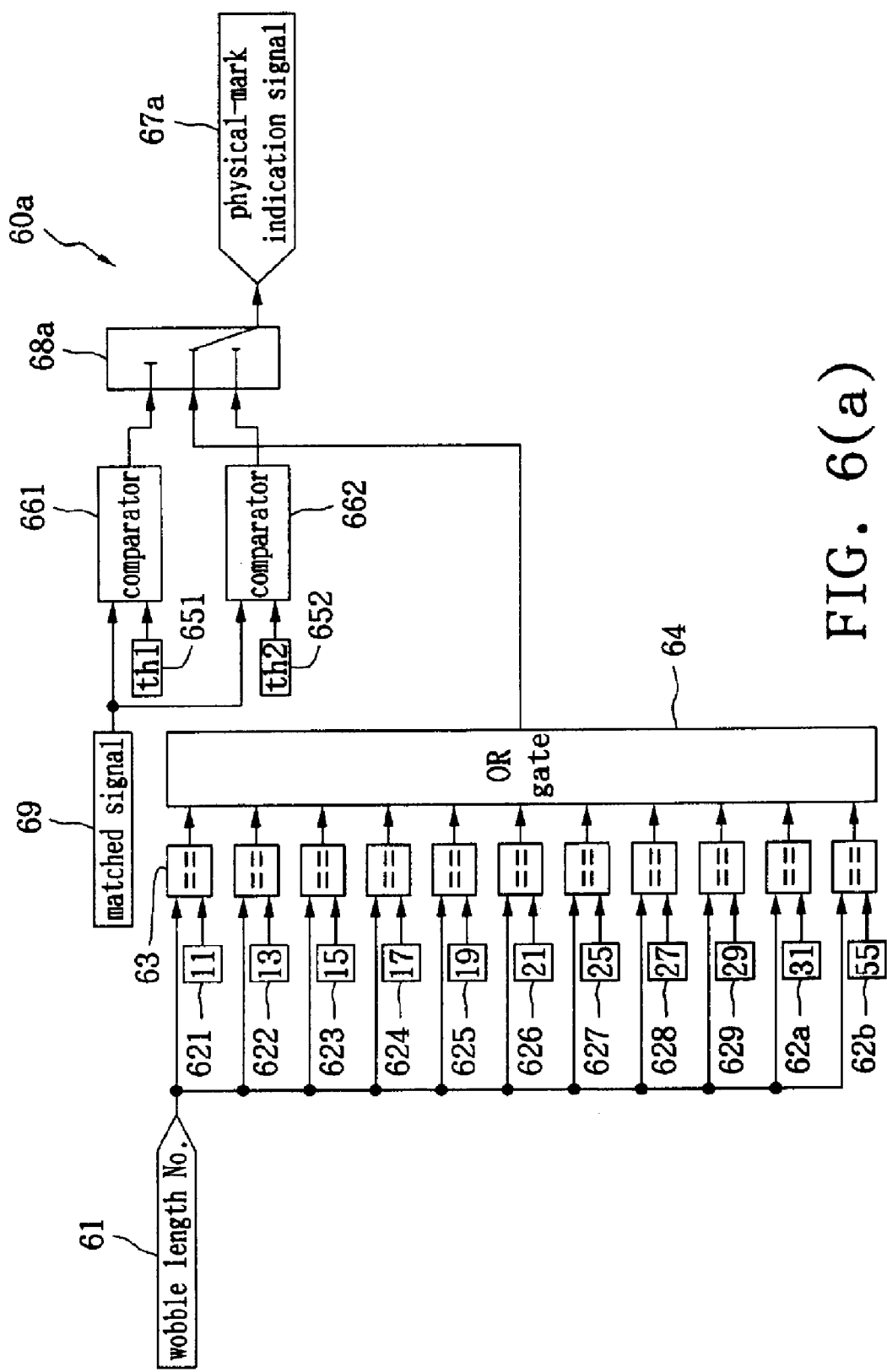
FIGS. 6(a)-6(c) are circuit diagrams of a physical-mark indicator in accordance with the present invention.

FIG. 6(a) is a circuit diagram of a physical-mark indicator in accordance with the present invention. In addition to the characteristics of the threshold value generator 60 in FIG. 6, the physical-mark indicator 60a compares a matched signal 69 with a first threshold value 651 by means of a comparator 661, and meanwhile compares the matched signal 69 with a second threshold value 652 through another comparator 662. Similarly, a multiple switch 68a is depended on whether the OR gate 64 is output or not. That is, the output signal either from the comparator 661 or the comparator 662 is designated as the physical mark indication signal 67a according to the operation result of the identification units 63 and the OR gate 64. This embodiment has further applications together employing a plurality of threshold values and a plurality of comparators, and a physical mark indication signal is chosen from the output signals of different logical combinations according to the status of the wobble signal.

Figure 6B:
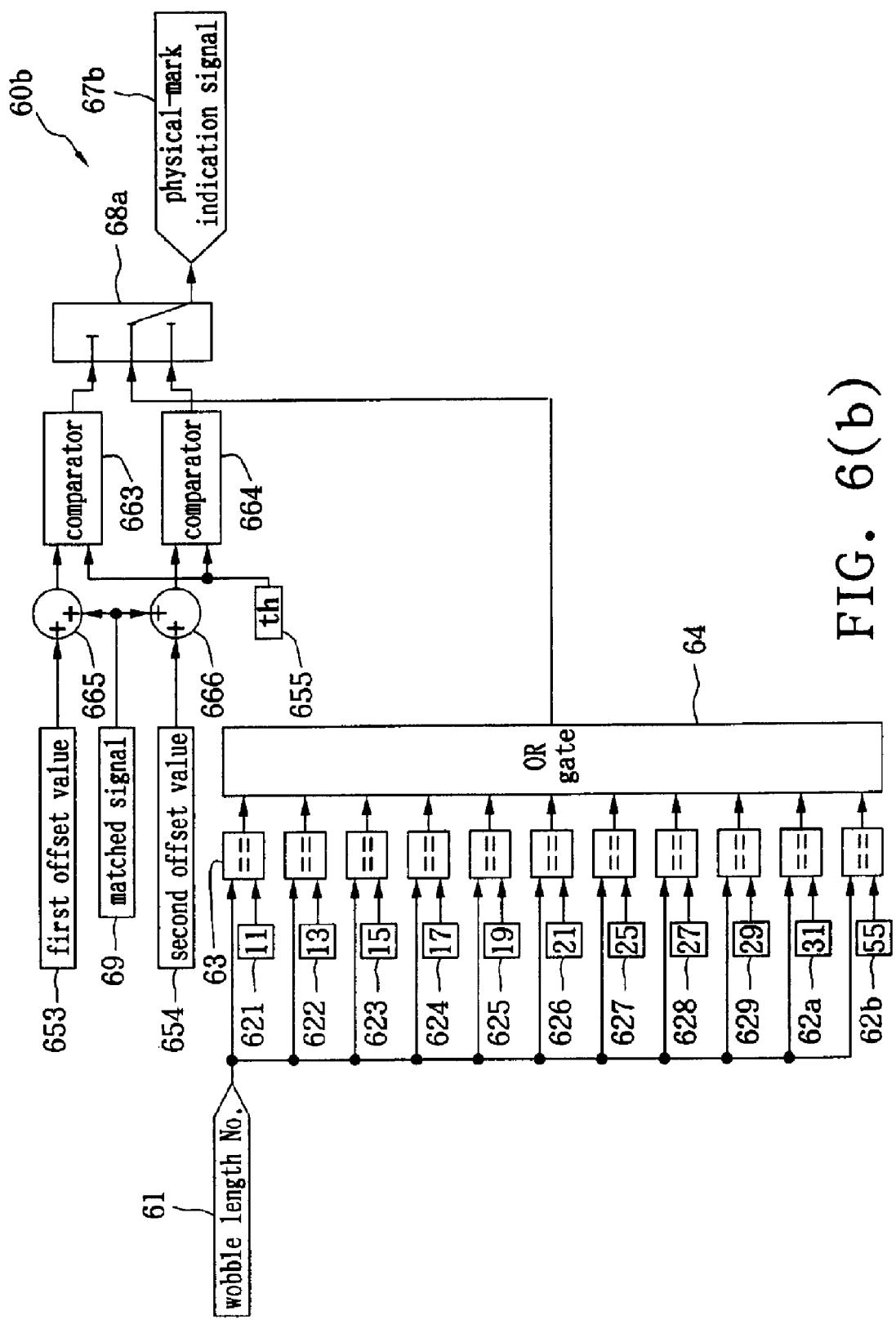

In comparison with FIG. 6(a), the matched signal 69 of the physical-mark indicator 60b in FIG. 6(b) is compensated simultaneously with a first offset value 653 and a second offset value 654 respectively by adders 665 and 666. Simultaneously, comparators 663 and 664 respectively compare one of the compensated signals with a threshold value 655. The multiple switch 68a is switched to a suitable input signal by the output of the OR gate. That is, one of the output signals from the comparators 663 and 664 is designated as a physical mark indication signal 67b.

Figure 6C:
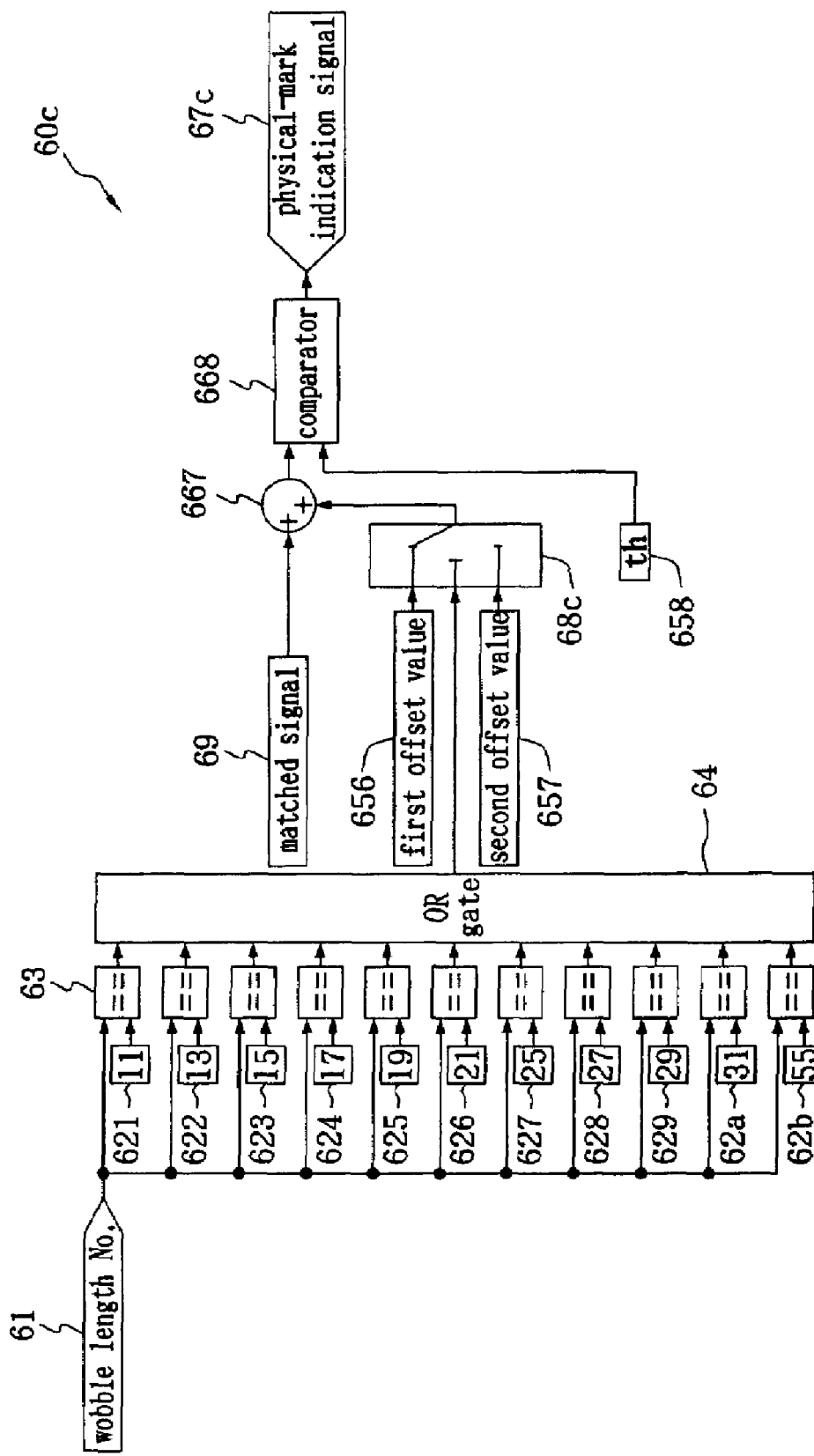

FIG. 6(c) is another circuit diagram of a physical-mark indicator in accordance with the present invention. The OR gate 64 of the physical-mark indicator 60c outputs signals to allow a multiple switch 68c to select one from a first offset value 656 and a second offset value 657 for adding it to the matched signal 69. An adder 667 sends the added signal to a comparator 668 to compare it with a threshold value 658, and then the comparator 668 generates a physical mark indication signal 67c.

Figure 7:
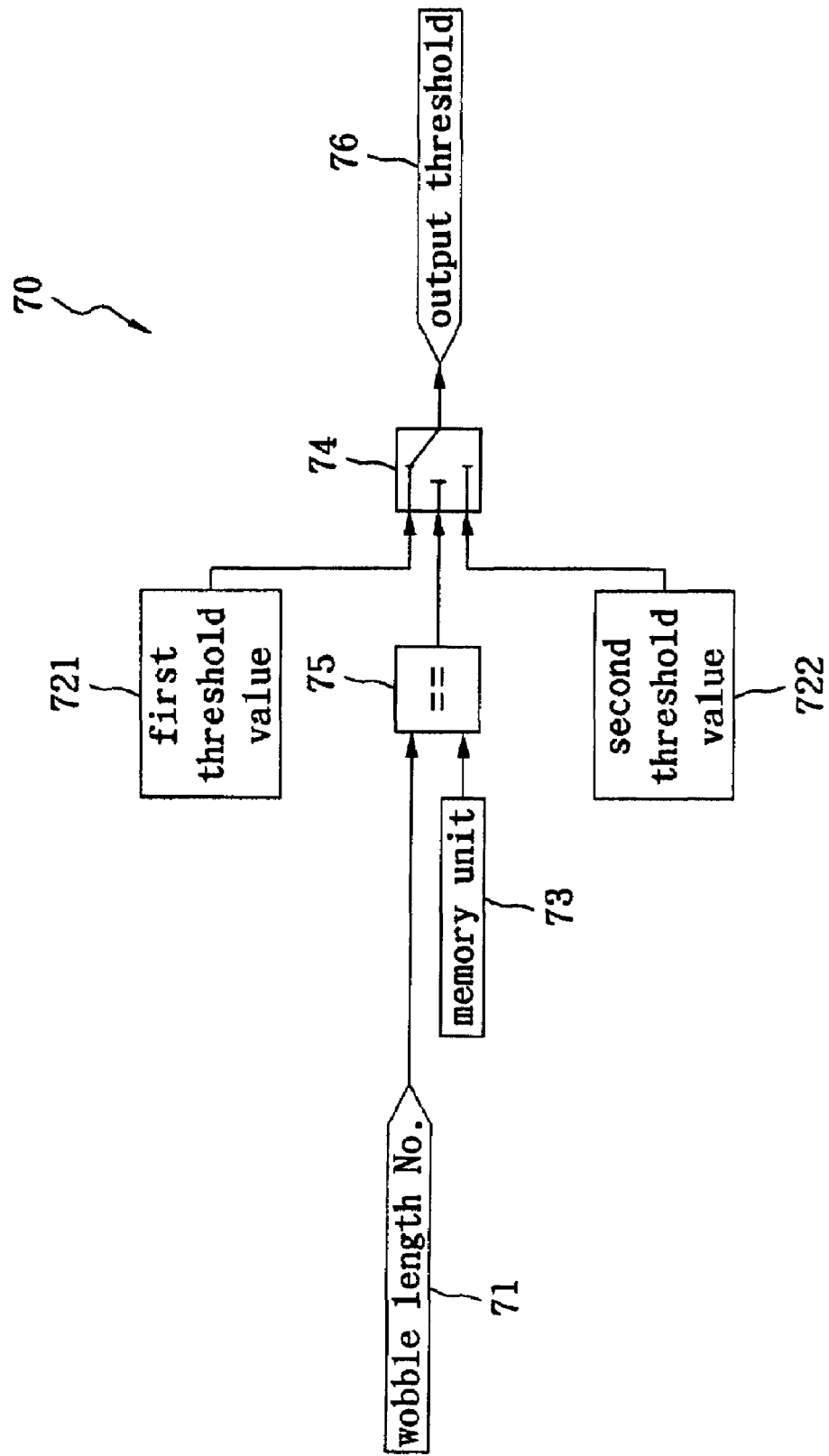
FIG. 7 is a circuit diagram of a threshold value generator in accordance with another embodiment of the present invention.

As shown in FIG. 1, the physical marks always occur in the odd wobble length numbers, but the physical marks may occur in the even ones for optical discs with various formats. FIG. 7 is a circuit diagram of a threshold value generator in accordance with another embodiment of the present invention, wherein physical marks are supposed to occur in even wobble length numbers. The wobble length number 71 of a wobble signal is compared with the numbers stored in the memory unit 73 by an identification unit 75. If the identification unit 75 detects the same number between its input terminals, it would output a control signal to switch a multiple switch 74 to a first threshold value 721. Then, the first threshold value 721 is designated as the output threshold value 76 of the threshold value generator 70. On the contrary, the multiple switch 74 is switched to a second threshold value 722, hence the second threshold value 722 is the output threshold value 76 in this condition.

The sync mark of an ADIP unit is more important than other physical marks. In order to reduce the probability for passing over the existence of a sync mark, a lower threshold value is designated to a corresponding wobble length number where a sync mark exists.

Figure 8:
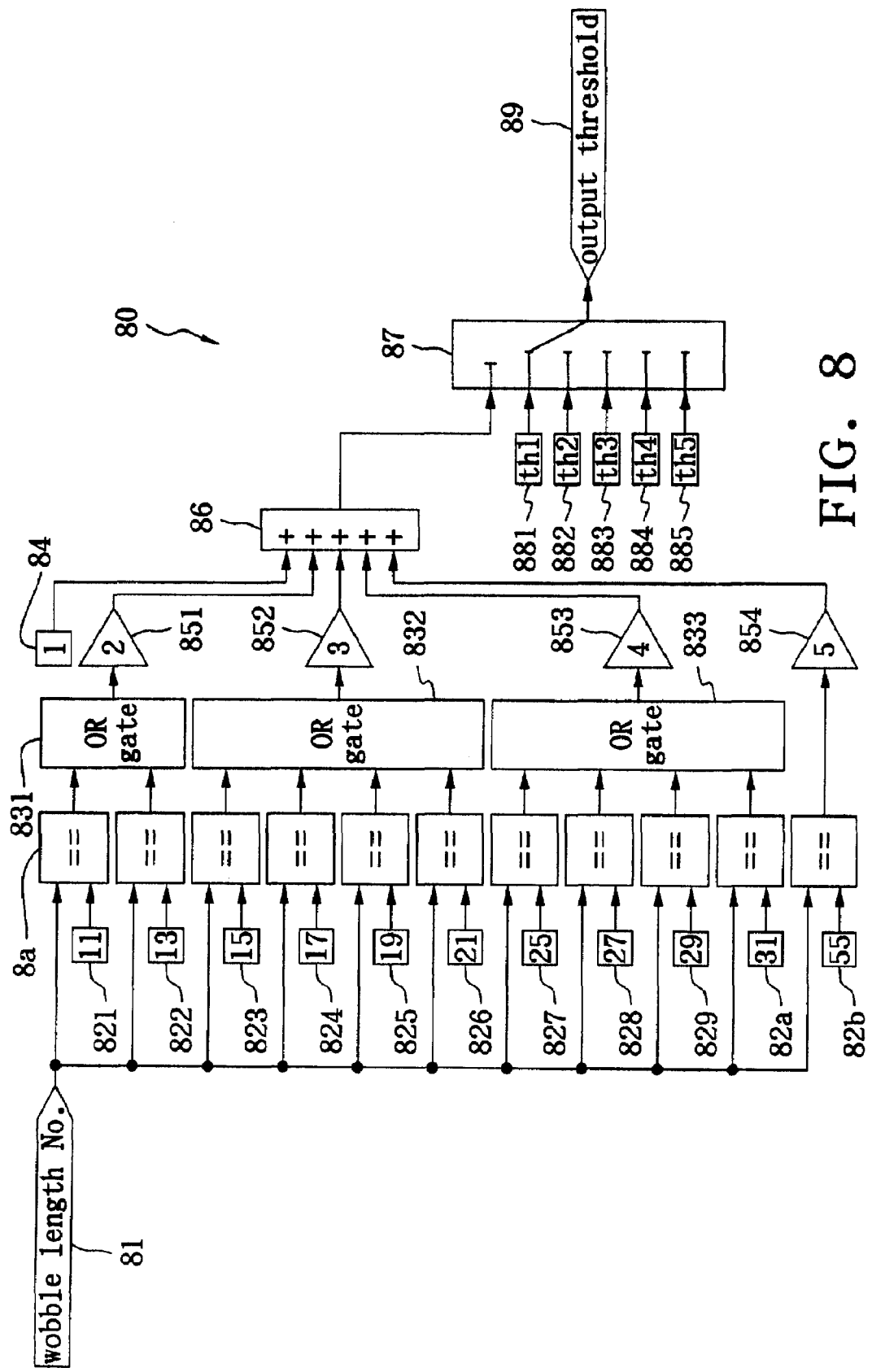
FIGS. 8-8(a) are circuit diagrams of a threshold value generator in accordance with yet another embodiment of the present invention.

In the data structure of an ADIP address word, the significance of the physical marks is different between the positions where they occur. That is, some physical marks may be neglected due to their inferior significance when the detection is executed. For example, it is comparatively unnecessary to completely and correctly detect the wobble length numbers 13 and 15 in FIG. 1, because the corresponding data can be decoded through the assistance and supplement of error correcting codes. FIG. 8 is a circuit diagram of a threshold value generator 80 in accordance with yet another embodiment of the present invention. One of ranges (or groups) of the wobble length numbers is corresponding to one of threshold values. Furthermore, the threshold values can be considered as various weighting indices. In addition to the wobble length number, ADIP unit numbers divided into several groups are also applied to a similar embodiment.

The wobble length number 81 of a wobble signal is separately compared with the numbers stored in the registers 821-829, 82a and 82b by identification units 8a. If the input terminals of the identification unit 8a are input the same number, one of the input terminals of OR gates 831-833 is activated by a corresponding input signal. The output terminals of the identification units 8a are separately connected to their corresponding flags 851-854. The flag 84 will be active while flags 851-854 are inactive. A multiplexer (MUX) 86 processes all the signals from the flags 851-854 and 84, and controls a multiple switch 87 to designate one of a first threshold value 881, a second threshold value 882, a third threshold value 883, a fourth threshold value 884 and a fifth threshold value 885 as an output threshold value 89.

Figure 8A:
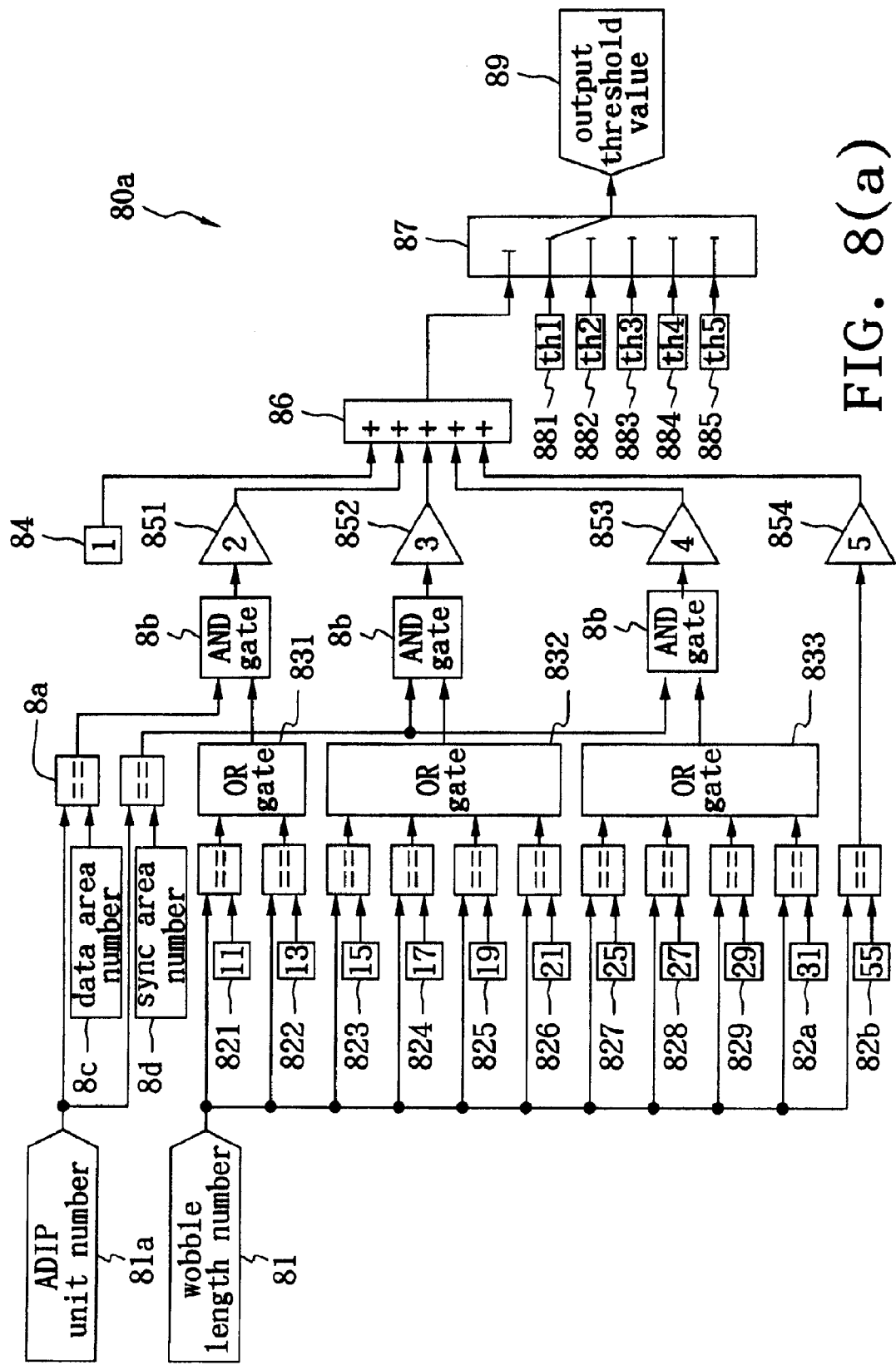

In comparison with FIG. 8, the threshold value generator 80a in FIG. 8(a) further comprises an ADIP unit number 81a as an input. When the ADIP unit number 81a and a data area number 8c are the same, the identification unit 8a sends a signal to an AND gate 8b; and meanwhile if the OR gate 831 is active, the flag 851 is allowed to send a signal to the multiplexer 86. On the other hand, when the ADIP unit number 81a and a sync area number 8d are the same, the identification unit 8a sends a signal to an AND gate 8b; and meanwhile if the OR gate 833 is active, the flag 853 is allowed to send a signal to the multiplexer 86. Furthermore, if the OR gate 832 is active rather than the OR gate 833, then the flag 852 is allowed to send a signal to the multiplexer 86. Various input criteria can be chosen such as the ADIP unit number 81a and wobble length number 81. The different combinations of numerous logic gates determine various choosing criteria for the threshold values.

Figure 9A:
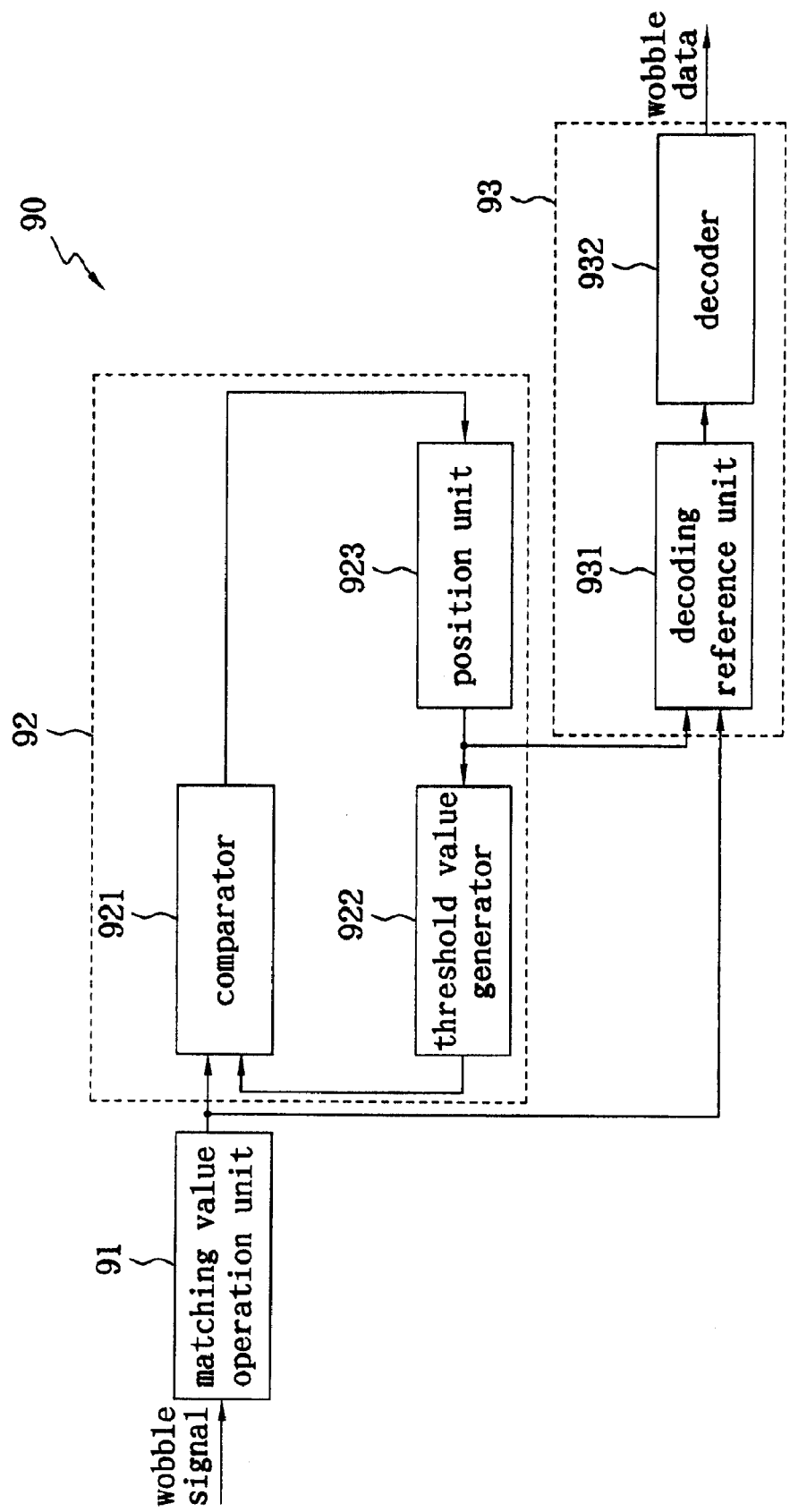
FIG. 9(a) is a functional block diagram of an apparatus for detecting physical marks from a wobble signal in accordance with yet another embodiment of the present invention.

FIG. 9(a) is a functional block diagram of an apparatus for detecting physical marks from a wobble signal in accordance with yet another embodiment of the present invention. A wobble signal is converted into a matched signal by the matching value operation unit 91 of a physical-mark detection apparatus 90. A physical mark indicator 92 commands a threshold value generator 992 to designate a threshold value according to the status of the wobble signal. Moreover, the designated threshold value is determined by the position information resulted from a position unit 923 which confirms the position of the wobble signal in the structure of a wobble data. The specified position can be represented by a wobble length number and/or an ADIP unit number. For example, the position unit 923 refers to the detected positions of the physical marks from the previous output signals of the comparator 921, and compares the corresponding detected position with the position of the current processed wobble signal, so the distance or relation between the two positions is taken to drive the threshold value generator 922 to designate an adequate threshold value for the comparator 921. In comparison with the decoder 53 of the physical-mark detection apparatus 50' in FIG. 5(*b*), the decoding module 93 of the embodiment further includes a decoding reference unit 931 in addition to a decoder 932. The decoding reference unit 931 continuously collects the processing result of the matched signal from the matching value operation unit 91 till the collected signal length is decodable, such as an ADIP address word, where the processing is according to the output signal of the position unit 923. Afterward, the decoder 932 converts the physical mark indication signal into wobble data with physical address information. Furthermore, an embodiment of the decoding reference unit 931 is given as following. The decoding reference unit 931 calculates the difference between the matched values corresponding to wobble length numbers 12 and 14 in a data unit.

Figure 9B:
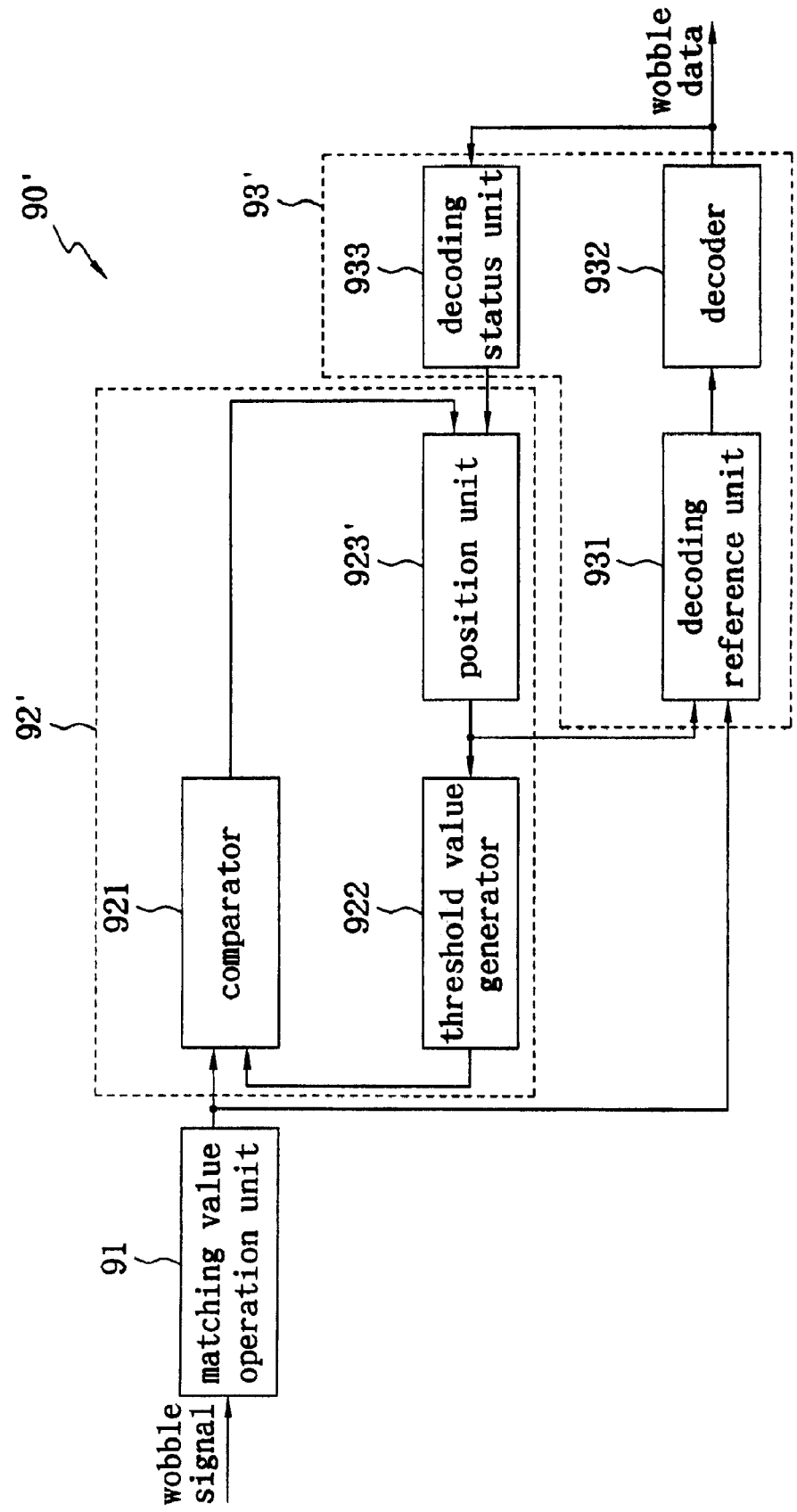
FIG. 9(b) is a functional block diagram of an apparatus for detecting physical marks from a wobble signal in accordance with still yet another embodiment of the present invention.

Referring to FIG. 9(*b*), when an optical storage apparatus starts to read data, the servo control system of the apparatus is temporarily at an unstable state. Therefore, the decoding module 93' of a physical-mark detection apparatus 90' further includes a decoding status unit 933 that sends part of the decoded wobble data and a confirmation of whether the decoded portion is correct or not to the position unit 923'.

Figure 10:
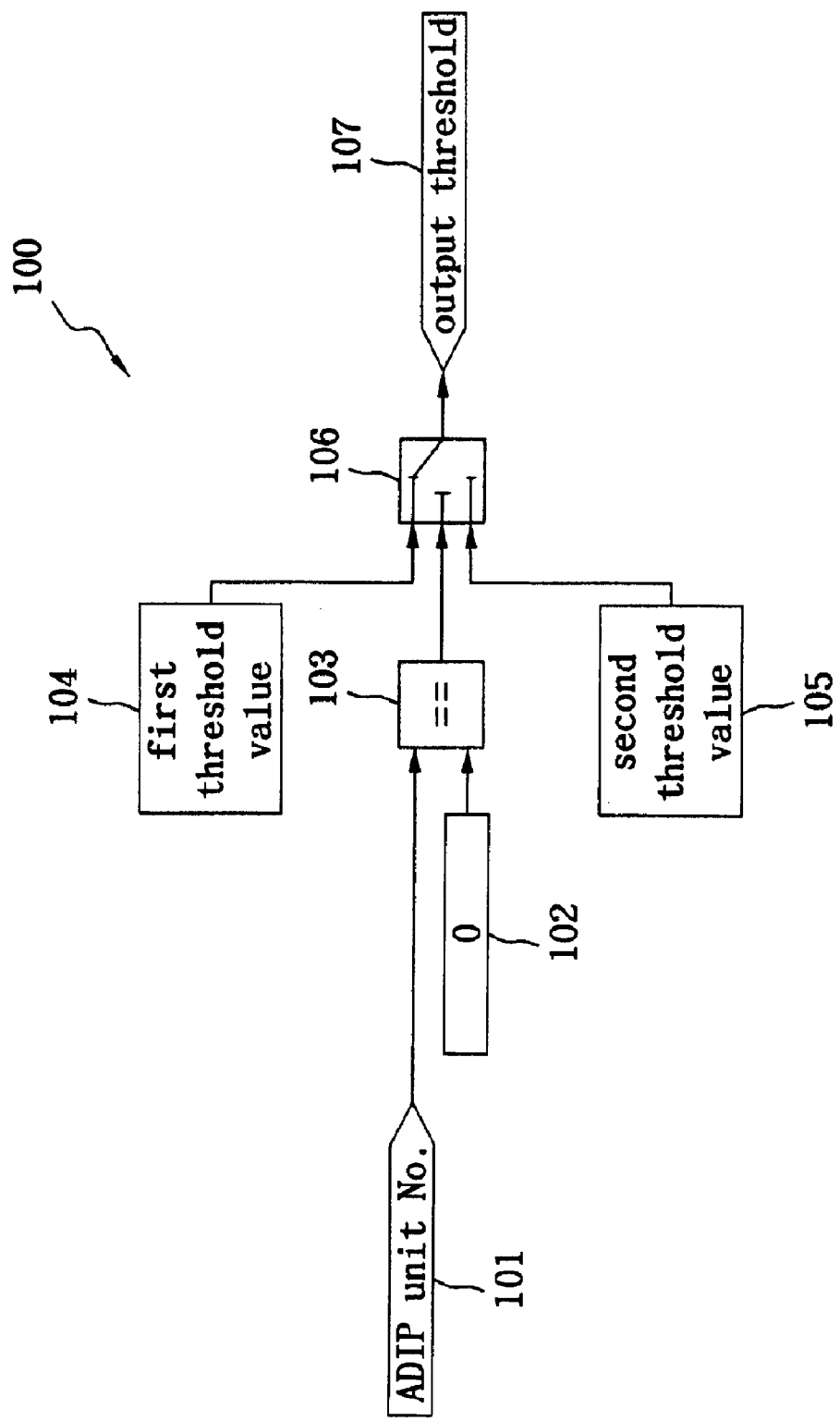
FIG. 10 is a circuit diagram of a threshold value generator in accordance with still yet another embodiment of the present invention.

FIG. 10 is a circuit diagram of a threshold value generator in accordance with still yet another embodiment of the present invention. The embodiment is related to reading physical address information from a DVD+RW disc or HD DVD disc. The ADIP unit numbers of an ADIP address word start from the number 0. An identification unit 103 compares a current ADIP unit number 101 with the number 0 stored in a register 102. If the ADIP unit number 101 is equal to 0, the threshold value generator 100 designates a first threshold value 104 as an output threshold value 107. On the contrary, a second threshold value 105 is designated as the output threshold value 107. The first threshold value 104 and second threshold value 105 are output from a multiplexer 106.

The above-described embodiments of the present invention are intended to be illustrative only. Numerous alternative embodiments may be devised by persons skilled in the art without departing from the scope of the following claims.

What is claimed as new and desired to be protected by Letters Patent of the United States is:

1. An apparatus for detecting physical marks from a wobble signal, comprising:
   a matching value operation unit having a matched result produced by matching a wobble signal with a matching reference signal and thus outputting a matched signal according to the matched result; and
   a physical mark indicator for designating one of at least two signal process criteria to process the matched signal according to a status of the wobble signal and thus outputting a physical mark indication signal.

2. The apparatus for detecting physical marks from a wobble signal of claim 1, wherein the at least two signal process criteria each employs a different threshold value to compare with the matched signal so as to output the physical mark indication signal.

3. The apparatus for detecting physical marks from a wobble signal of claim 1, wherein the at least two signal process criteria each employs a different offset value to synthesize with the matched signal, and all the synthesized signals are compared with a threshold value before the physical mark indication signal is output.

4. The apparatus for detecting physical marks from a wobble signal of claim 1, wherein the at least two signal process criteria simultaneously and respectively employ different threshold values to compare with the matched signal, and one of the compared signals is designated as the physical mark indication signal.

5. The apparatus for detecting physical marks from a wobble signal of claim 1, wherein the at least two signal process criteria simultaneously and respectively employ different threshold values to compare with the matched signal, each of the compared signals is through the operation of a logical combination, and one of the processed signals after the operation is designated as the physical mark indication signal according to the status of the wobble signal.

6. The apparatus for detecting physical marks from a wobble signal of claim 1, wherein the at least two signal process criteria each employs a different offset value to synthesize with the matched signal, and one of the synthesized signals is designated as the physical mark indication signal.

7. An apparatus for detecting physical marks from a wobble signal, comprising:
   a matching value operation unit having a matched result produced by matching a wobble signal with a matching reference signal and thus outputting a matched signal according to the matched result; and
   a physical mark indicator for designating one of at least two threshold values according to a status of the wobble signal and comparing the designated threshold value with the matched signal so as to output a physical mark indication signal.

8. The apparatus for detecting physical marks from a wobble signal of claim 7, wherein the physical mark indicator includes:
   a comparator for comparing the designated threshold value with the matched signal so as to output the physical mark indication signal; and
   a threshold value generator for selecting the designated threshold value from a plurality of threshold values according to the status of the wobble signal.

9. The apparatus for detecting physical marks from a wobble signal of claim 7, wherein the physical mark indicator includes:
   a comparator for comparing the designated threshold value with the matched signal so as to output the physical mark indication signal;
   a position unit for specifying where the current physical mark indication signal is in the structure of wobble data and thus outputting a positioned signal; and
   a threshold value generator for selecting the designated threshold value from a plurality of threshold values according to the positioned signal.

10. The apparatus for detecting physical marks from a wobble signal of claim 9, wherein the position unit figures out the interval between the specified position of the current physical mark indication signal and the detected position of a previous detected physical mark.

11. The apparatus for detecting physical marks from a wobble signal of claim 9, further comprising a decoding module for converting the physical mark indication signal into wobble data with physical address information.

12. The apparatus for detecting physical marks from a wobble signal of claim 11, wherein the decoding module includes:
a decoding reference unit for continuously collecting the physical mark indication signal till the collected signal length is decodable according to output signals from the position unit; and
a decoder for converting the physical mark indication signal with a decodable length into the wobble data.

13. The apparatus for detecting physical marks from a wobble signal of claim 12, wherein the decoding module further includes:
a decoding status unit for sending the status of the wobble data back to the physical mark indicator.

14. The apparatus for detecting physical marks from a wobble signal of claim 11, wherein the decoding module includes:
a decoding reference unit for continuously collecting the processing result of the matched signal from the matching value operation unit till the collected signal length is decodable, wherein the processing is according to output signals from the position unit; and
a decoder for converting the processing result with a decodable length into the wobble data.

15. The apparatus for detecting physical marks from a wobble signal of claim 14, wherein the decoding module further includes:
a decoding status unit for sending the status of the wobble data back to the physical mark indicator.

16. The apparatus for detecting physical marks from a wobble signal of claim 11, wherein the wobble data is an ADIP address word.

17. The apparatus for detecting physical marks from a wobble signal of claim 7, wherein the physical mark indicator designates the threshold value according to a position of the wobble signal.

18. The apparatus for detecting physical marks from a wobble signal of claim 17, wherein the position is where the wobble signal is in the structure of the wobble data.

19. The apparatus for detecting physical marks from a wobble signal of claim 17, wherein the position is a wobble length number of the wobble signal which appears in the structure of the wobble data.

20. The apparatus for detecting physical marks from a wobble signal of claim 17, wherein the position is an ADIP unit number of the wobble signal which appears in the structure of the wobble data.

21. The apparatus for detecting physical marks from a wobble signal of claim 17, wherein the position is an ADIP unit number and a wobble length number of the wobble signal which appears in the structure of the wobble data.

22. The apparatus for detecting physical marks from a wobble signal of claim 19, wherein the physical mark indicator separately designates a threshold value in accordance with odd and even wobble length numbers.

23. The apparatus for detecting physical marks from a wobble signal of claim 19, wherein the physical mark indicator separately designates a threshold value in accordance with at least one group of the specified wobble length numbers and a group of the other unspecified wobble length numbers.

24. The apparatus for detecting physical marks from a wobble signal of claim 17, wherein the physical mark indicator designates a threshold value with a lower qualification in accordance with wobble length numbers where the physical marks more possibly exist.

25. The apparatus for detecting physical marks from a wobble signal of claim 19, wherein the physical mark indicator designates a threshold value in accordance with the wobble length numbers where a sync mark is existent.

26. The apparatus for detecting physical marks from a wobble signal of claim 21, wherein the physical mark indicator separately designates a threshold-value choosing rule in accordance with the ADIP unit numbers where a sync unit is existent.

27. The apparatus for detecting physical marks from a wobble signal of claim 21, wherein the physical mark indicator separately designates a threshold-value choosing rule in accordance with at least one group of the specified ADIP unit numbers and a group of the other unspecified ADIP unit numbers.

28. The apparatus for detecting physical marks from a wobble signal of claim 7, wherein the wobble signal is read from a Blu-ray disc, a DVD+RW disc or an HD DVD disc.

29. An apparatus for detecting physical marks from a wobble signal, comprising:
a matching value operation unit for performing a comparison between a wobble signal and a normal clock signal or a specific matching reference signal so as to output a matched signal according to the comparison;
a threshold value generator for designating one of at least two threshold values according to a status of the wobble signal; and
a comparator for comparing the designated threshold value with the matched signal so as to output a physical mark indication signal.

30. The apparatus for detecting physical marks from a wobble signal of claim 29, further comprising a position unit for specifying where the current physical mark indication signal is in the structure of wobble data and thus outputting a positioned signal to trigger the threshold value generator to designate the threshold value.

31. The apparatus for detecting physical marks from a wobble signal of claim 30, further comprising:
a decoding reference unit for continuously collecting the physical mark indication signal till the collected signal length is decodable according to output signals from the position unit; and
a decoder for converting the physical mark indication signal with a decodable length into the wobble data with physical address information.

32. The apparatus for detecting physical marks from a wobble signal of claim 31, wherein the decoding module further includes:
a decoding status unit for sending the status of the wobble data back to the position unit.

33. The apparatus for detecting physical marks from a wobble signal of claim 30, further comprising:
a decoding reference unit for continuously collecting the processing result of the matched signal from the matching value operation unit till the collected signal length is decodable, wherein the processing is according to output signals from the position unit; and
a decoder for converting the processing result with a decodable length into the wobble data with physical address information.

34. The apparatus for detecting physical marks from a wobble signal of claim 33, wherein the decoding module further includes:
a decoding status unit for sending the status of the wobble data back to the position unit.

35. The apparatus for detecting physical marks from a wobble signal of claim 30, wherein the wobble data is an ADIP address word.

36. The apparatus for detecting physical marks from a wobble signal of claim 29, wherein the physical mark indicator designates the threshold value according to a position of the wobble signal.

37. The apparatus for detecting physical marks from a wobble signal of claim 36, wherein the position is a wobble length number of the wobble signal which appears in the structure of the wobble data.

38. The apparatus for detecting physical marks from a wobble signal of claim 36, wherein the position is an ADIP unit number of the wobble signal which appears in the structure of the wobble data.

39. The apparatus for detecting physical marks from a wobble signal of claim 36, wherein the position is an ADIP unit number and a wobble length number of the wobble signal which appears in the structure of the wobble data.

40. The apparatus for detecting physical marks from a wobble signal of claim 37, wherein the physical mark indicator separately designates a threshold value in accordance with odd and even wobble length numbers.

41. The apparatus for detecting physical marks from a wobble signal of claim 37, wherein the physical mark indicator separately designates a threshold value in accordance with at least one group of the specified wobble length numbers and the group of the other unspecified wobble length numbers.

42. The apparatus for detecting physical marks from a wobble signal of claim 37, wherein the physical mark indicator designates a threshold value with a lower qualification in accordance with wobble length numbers where the physical marks more possibly exist.

43. The apparatus for detecting physical marks from a wobble signal of claim 37, wherein the physical mark indicator designates a threshold-value with a lower qualification in accordance with the wobble length numbers where a sync mark is existent.

44. The apparatus for detecting physical marks from a wobble signal of claim 39, wherein the physical mark indicator separately designates a threshold-value choosing rule in accordance with the wobble length numbers where a sync unit is existent.

45. The apparatus for detecting physical marks from a wobble signal of claim 39, wherein the physical mark indicator separately designates a threshold-value choosing rule in accordance with at least one group of the specified ADIP unit numbers and a group of the other unspecified ADIP unit numbers.

46. The apparatus for detecting physical marks from a wobble signal of claim 29, wherein the wobble signal is read from a Blu-ray disc, a DVD+RW disc or an HD DVD disc.

47. An apparatus for detecting physical marks from a wobble signal, comprising:
a matching value operation unit having a matched result produced by matching a wobble signal with a matching reference signal to find out their waveform differences and thus outputting a matched signal according to the matched result; and
a physical mark indicator for designating one of at least two offset values according to a status of the wobble signal and synthesizing the designated offset value with the matched signal and later comparing the synthesized signal with a threshold value so as to output a physical mark indication signal.

48. The apparatus for detecting physical marks from a wobble signal of claim 47, further comprising a decoding module for converting the physical mark indication signal into wobble data with physical address information.

49. The apparatus for detecting physical marks from a wobble signal of claim 47, wherein the offset values separately weigh a position of the wobble signal where a physical mark more possibly exists.

50. An apparatus for detecting physical marks from a wobble signal, comprising:
a matching value operation unit having a matched result produced by matching a wobble signal with a matching reference signal and thus outputting a matched signal according to the matched result; and
a physical mark indicator simultaneously employing at least two threshold values to respectively compare with the matched signal and designating one of the compared signals as a physical mark indication signal.

51. The apparatus for detecting physical marks from a wobble signal of claim 50, wherein the physical mark indicator designates the compared signal as the physical mark indication signal according to a position of the wobble signal.

52. The apparatus for detecting physical marks from a wobble signal of claim 51, wherein the position is where the wobble signal is in the structure of the wobble data.

53. The apparatus for detecting physical marks from a wobble signal of claim 51, wherein the position is a wobble length number of the wobble signal which appears in the structure of the wobble data.

54. The apparatus for detecting physical marks from a wobble signal of claim 51, wherein the position is an ADIP unit number of the wobble signal which appears in the structure of the wobble data.

55. The apparatus for detecting physical marks from a wobble signal of claim 51, wherein the position is an ADIP unit number and a wobble length number of the wobble signal which appears in the structure of the wobble data.

56. The apparatus for detecting physical marks from a wobble signal of claim 53, wherein the physical mark indicator separately designates one of the compared signals as the physical mark indication signal in accordance with odd and even wobble length numbers.

57. The apparatus for detecting physical marks from a wobble signal of claim 53, wherein the physical mark indicator designates one of the compared signals as the physical mark indication signal in accordance with a group of the specified wobble length numbers and designates another one of the compared signals as the physical mark indication signal in accordance with a group of the other unspecified wobble length numbers.

58. The apparatus for detecting physical marks from a wobble signal of claim 51, wherein the physical mark indicator designates one of the compared signals with a lower qualification as the physical mark indication signal in accordance with wobble length numbers where the physical marks more possibly exist.

59. The apparatus for detecting physical marks from a wobble signal of claim 53, wherein the physical mark indicator separately designates one of the compared signals as the physical mark indication signal in accordance with the wobble length numbers where a sync mark is existent.

60. The apparatus for detecting physical marks from a wobble signal of claim 54, wherein the physical mark indicator separately designates one of the compared signals in accordance with the ADIP unit numbers where a sync unit is existent.

61. The apparatus for detecting physical marks from a wobble signal of claim 55, wherein the physical mark indicator designates one of the threshold value choosing rule in accordance with a group of the specified ADIP unit numbers and designates another threshold value choosing rule in accordance with a group of the other unspecified ADIP unit numbers.

62. A method for detecting physical marks from a wobble signal, comprising the steps of:
  computing a matched result produced by matching a wobble signal with a matching reference signal and thus outputting a matched signal according to the matched result; and
  designating one of at least two signal process criteria to process the matched signal according to a status of the wobble signal and thus outputting a physical mark indication signal.

63. The method for detecting physical marks from a wobble signal of claim 62, wherein the at least two signal process criteria each employs a different threshold value to compare with the matched signal so as to output the physical mark indication signal.

64. The method for detecting physical marks from a wobble signal of claim 62, wherein the at least two signal process criteria each employs a different offset value to synthesize with the matched signal so as to output the physical mark indication signal.

65. The method for detecting physical marks from a wobble signal of claim 62, wherein the at least two signal process criteria simultaneously employs respective threshold values to compare with the matched signal and designates one of the compared signals as the physical mark indication signal.

66. The method for detecting physical marks from a wobble signal of claim 62, wherein the at least two signal process criteria simultaneously and respectively employ different threshold values to compare with the matched signal, each of the compared signals are through operations of logical combination, and one of the signals after the operations is designated as the physical mark indication signal according to the status of the wobble signal.

67. The method for detecting physical marks from a wobble signal of claim 63, wherein the threshold value is designated according to a position of the wobble signal.

68. The method for detecting physical marks from a wobble signal of claim 67, wherein the position is a wobble length number of the wobble signal which appears in the structure of the wobble data.

69. The method for detecting physical marks from a wobble signal of claim 67, wherein the position is an ADIP unit number of the wobble signal which appears in the structure of the wobble data.

70. The method for detecting physical marks from a wobble signal of claim 67, wherein the position is an ADIP unit number and a wobble length number of the wobble signal which appears in the structure of the wobble data.

71. The method for detecting physical marks from a wobble signal of claim 68, wherein the threshold values are separately designated in accordance with odd and even wobble length numbers.

72. The method for detecting physical marks from a wobble signal of claim 68, wherein the threshold values are separately designated in accordance with at least one group of the specified wobble length numbers and a group of the other unspecified wobble length numbers.

73. The method for detecting physical marks from a wobble signal of claim 63, wherein the threshold value with a lower qualification is designated in accordance with a wobble length number where the physical mark more possibly exists.

74. The method for detecting physical marks from a wobble signal of claim 62, further comprising a step of converting the physical mark indication signal into wobble data with physical address information.

75. The method for detecting physical marks from a wobble signal of claim 68, wherein the physical mark indicator designates a threshold value with a lower qualification in accordance with the wobble length numbers where a sync mark is existent.

76. The method for detecting physical marks from a wobble signal of claim 70, wherein the physical mark indicator separately designated a threshold-value choosing rule in accordance with the ADIP unit numbers where a sync unit is existent.

77. The method for detecting physical marks from a wobble signal of claim 70, wherein the physical mark indicator separately designated a threshold-value choosing rule in accordance with at least one group of the specified ADIP unit numbers and a group of the other unspecified ADIP unit numbers.

* * * * *